United States Patent [19]

Smith et al.

[11] Patent Number: 4,894,406
[45] Date of Patent: Jan. 16, 1990

[54] LOW ODOR COALESCING AID FOR LATEX PAINTS

[75] Inventors: Richard L. Smith, Kingsport, Tenn.; Garland P. Sprinkle, Jr., Louisville, Ky.

[73] Assignee: Eastman Kodak Company, Rochester, N.Y.

[21] Appl. No.: 233,778

[22] Filed: Aug. 19, 1988

[51] Int. Cl.$^4$ .............................................. C08K 5/10
[52] U.S. Cl. .................... 524/310; 524/315; 524/317; 524/804
[58] Field of Search .................. 524/310, 315, 317

[56] References Cited

U.S. PATENT DOCUMENTS

| | | | |
|---|---|---|---|
| 3,736,287 | 5/1973 | Patella | 260/29.6 TA |
| 3,749,690 | 7/1973 | Patella | 260/29.6 TA |
| 4,455,402 | 6/1984 | Amick et al. | 524/315 |

Primary Examiner—Joseph L. Schofer
Assistant Examiner—M. Sweet
Attorney, Agent, or Firm—John F. Stevens; William P. Heath, Jr.

[57] ABSTRACT

The present invention relates to low odor coalescing aids for latex paints comprising 2-alkyl-1,3-hexanediol alkyl esters

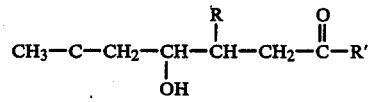

These coalescing aids are incorporated into latex paints in an amount sufficient to speed curing and lower curing temperatures.

2 Claims, No Drawings

LOW ODOR COALESCING AID FOR LATEX PAINTS

TECHNICAL FIELD

The present invention relates to colescing aids for latex paints.

BACKGROUND OF THE INVENTION

Latex paints are currently used in a variety of applications and are well known in the art. Basically, they are low viscosity, aqueous emulsions of synthetic resins, pigments and other additives which are fast drying and most desirably have low odor. The formulation of a latex paint consists basically of combining pigment and additives with the latex. Additives which may be used include pigment-dispersing agents, preservatives, defoamers, freeze-thaw stabilizers and coalescing aids. The present invention relates to coalescing aids for such latex paints. The coalescing aids help in the formation of a film of the latex paint, especially at lower temperatures. Coalescing aids for latex paints should exhibit water immiscibility, good hydrolytic stability, a low freezing point, low odor, a slow evaporation rate and a high coalescing efficiency. Most commercially available coalescing aids exhibit several of the foregoing properties. However, none of the commercially available coalescing aids for latex paints exhibit all six of these desirable properties. There are numerous compounds which have been used in conjunction with latex paints as coalescing aids. Among these are 2,2,4-trimethylpentane-1,3-diol monisobutyrate, diethylene glycol monethyl ether, diethylene glycol monopropyl ether, diethylene glycol monobutyl ether, ethylene glycol-2-ethylhexyl ether, ethylene glycol monophenyl ether, dipropylene glycol monomethyl ether acetate and diethylene glycol monoethyl ether acetate. Each of these compounds lacks one or more of the properties desired of a coalescing aid.

DESCRIPTION OF THE INVENTION

The present invention provides to a paint composition including a water-based latex dispersion and an effective amount o a coalescing aid.

The present invention provides a coalescing aid for latex paints which is water immiscible, has good hydrolytic stability, has a low freezing point, has a low odor, has a slow evaporation rate, and has a high coalescing efficency.

The coalescing aids of the invention are 2-alkyl-1,3-hexanediol alkyl esters which can be made by condensing 2-alkyl-1,3-hexanediol with a $C_2$–$C_7$ carboxylic acid under standard conditions for known condensation reactions of this type. One of the products of such a condensation reaction will be the desired compound of the present invention and this compound can be separated from the reaction mixture by conventional separation methods, such as fractional distillation.

The 2-alkyl-1,3-hexanediol alkyl esters useful in the present invention are generally incorporated in latex paint-containing compositions in an amount of about 1 wt % to about 15 wt %, based on the emulsion solids content of the paint composition. More preferably, the coalescing aid is present in an amount of about 4 wt % to about 12 wt %, based on the emulsion solids content of the latex paint composition.

Among the 2-alkyl-1,3-hexanediol alkyl esters useful as latex paint coalescing aids are
2-ethyl-1,3-hexanediol monoutyrate,
2-ethyl-1,3-hexanediol isobutyrate,
2-methyl-1,3-hexanediol monobutyrate and
2-methyl-1,3-hexanediol isobutyrate.

In order to make a latex paint composition in accordance witht the present invention, one simply follows conventional processes for formulating latex paint compositions and incorporates effective amounts of the 2-alkyl-1,3-hexanediol alkyl ester coalescing aids. Typical latex paint compositions and processes for preparing same are described in U.S. Pat. Nos. 3,749,690 and 3,736,287, which are hereby incorporated by reference.

2-Alkyl-1,3-hexanediol alkyl esters have been found to be versatile coalescing aids for latex paints. The excellent hydrolytic stability of these compounds allows them to be used in all latex paints, even those with a high pH. In addition, the low odor of these compounds is highly desirable for latex paints used for interior applications. Also, these coalescing aids can be used together with other ingredients such as defoaming agents, fillers and thickening agents without adverse effects.

Latex paints in accordance with the present invention are formulated by mixing an already prepared latex with an admixture of pigmentary material including primary pigments and extender pigments in a suitable vessel. The latex may be made by any suitable known method for preparing latexes.

In combining the paint constituents to formulate a latex paint of the present invention, one or more primary pigments, extender pigments and other adjuvants (which may themselves be liquid or solid), if any, can be incorporated into the latex binder to form a smooth, uniform mixture simply by adding all the materials to a vessel with stirring. While it is possible to combine pigments and the like with the latex and to grind or otherwise triturate the admixture in a mill, it is desirable to first prepare an aqueous paste of pigment and adjuvants, preferably with the aid of a dispersing agent, in a high-shear mixture and then combine the paste with the latex. The consistency of the paint can be controlled by the relative amounts of water and pigments and adjuvants used.

Pigmentary material suitable for use in formulating the water-base paints of the present invention include (but are not limited to) conventional primary pigments or color bodies such as titanium oxide, carbon black, cadmium sulfide, cadmium selenide, copper phthalocyanine, zinc oxide, zinc sulfide, iron oxide, chromium oxide, and the like. The proportion of pigmentary material used in formulating a water-base paint of the present invention is expressed herein in terms of "pigment volume concentrations" (PVC), according to the following relationship:

$$PVC = \frac{\text{Volume of Pigmentary Material} \times 100}{\text{Volume of Pigmentary Material} + \text{Volume of Latex Solids}}$$

The choice of a particular pigment volume concentration is determined by a number of factors, including the desired depth of color, covering power, and the like. Generally, the water-base paints of the present invention can have pigment volume concentrations ranging from about 20 percent or less up to about 75 percent. Preferably, these water-base paints have pigment volume concentrations of between about 45 percent and about 70 percent.

In addition to primary pigments, one or more various extender pigments or other adjuvants can, if desired, be included in the formulation of the water-base paints of the present invention. Such materials include (but are not limited to) dispersing and emulsifying agents; thickeners; sizing agents; fillers (i.e., "extender pigments"; antifreeze agents; filming agents; protective colloids; and the like. The selection of particular adjuvants and the relative amounts thereof are generally governed by the properties desired in a particular water-base paint and will be apparent to those skilled in the art. In general, however, the latex paints of the present invention will have total solids contents between about 40 and about 65 weight percent.

The water-base paints of the present invention can be applied to a wall surface or substrate surface in any conventional manner, e.g., by brush, roller, spraying, and the like. The paint can be cured or dried after application to the substrate, likewise by conventional means, e.g., air drying, baking, and the like. The cured paint coating exhibits excellence performance with regard to low temperature coalesence.

The following examples are submitted for a better understanding of the invention.

EXAMPLE 1

A coalescing aid in accordance with the present invention, namely 2-ethyl-1,3-hexanediol monobutyrate having the structure

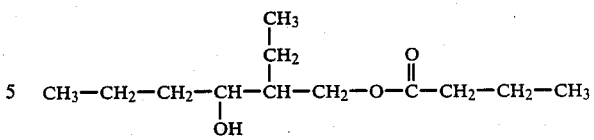

was added to a commercially available latex paint. In addition, several known, commercially available coalescing aids were also added to the same latex paint composition. The coalescing aids are used in amounts of about 8% by weight, based on emulsion solids weight. Table 1 shows a comparison of the features of the latex paint employing the coalescing aid of the present invention (Ex 1a) as well as the latex paints employing the commercially available coalescing aids (Ex 1b–1k).

TABLE 1

| | | Comparison of Features of Commercial Coalescing Aids | | | | | |
|---|---|---|---|---|---|---|---|
| Ex | Coalescing Aid | Water Immiscibility | Hydrolytic Stability | Freezing Point | Odor | Slow Evap. Rate | Coalescing Efficiency |
| 1a | 2-Ethyl-1,3-Hexanediol Monobutyrate | + | + | + | + | + | + |
| 1b | 2,2,4-trimethyl pentane-1,3-diol monoisobutyrate | + | + | + | − | + | + |
| 1c | Diethylene glycol monoethyl ether | − | + | + | + | + | − |
| 1d | Diethylene glycol monopropyl ether | − | + | + | + | + | − |
| 1e | Diethylene glycol monobutyl ether | − | + | + | − | + | − |
| 1f | Ethylene glycol-2-ethylhexyl ether | + | + | + | − | + | + |
| 1g | Diethylene glycol monoethyl ether acetate | − | − | + | + | + | − |
| 1h | Diethylene glycol monobutyl ether acetate | + | − | + | + | + | + |
| 1i | Ethylene glycol monophenyl ether | + | + | − | + | + | + |
| 1j | Propylene glycol monophenyl ether | + | + | − | + | + | + |
| 1k | Dipropylene glycol monomethyl ether acetate | + | − | + | + | + | + |

+ indicates satisfactory performance in that category
− indicates unsatisfactory performance in that category From this comparison it is clear that the 2-ethyl-1,3-hexanediol monobutyrate of the present invention is the only coalescing aid of those tested which was satisfactory in all categories. Each of the remaining tested coalescing aids were unsatisfactory in one or more categories.

EXAMPLE 2

A coalescing aid in accordance with the present invention, 2-ethyl-1,3-hexanediol monobutyrate and 2,2,4-trimethylpentane-1,3-diol (TMPD) monoisobutyrate, a commercially available coalescing aid were compared with regard to specific properties which are important to the function of coalescing aids. The coalescing aids are used in amounts of about 8 wt %, based on emulsion solids weight, in otherwise conventional latex paints.

| Property | 2-Ethyl-1,3-Hexanediol Monobutyrate | TMPD Monobutyrate Coalescing Aid |
|---|---|---|
| Evaporation Rate (n-Butyl Acetate = 1) | 0.01 | 0.01 |
| Water Miscibility, wt % | | |
| In Water | 0.6 | Insoluble |
| Water In | 3.4 | 0.9 |
| Odor | Mild[1] | Moderate |
| Hydrolytic Stability[2] | | |
| Wt % diol, initial | 1.3 | None Detected |
| Wt % diol, final | 1.6 | None Detected |

[1] In an odor comparison in latex paints, the odor of a freshly painted surface containing 2-ethyl-1,3-hexanediol monobutyrate was preferred by a 2 to 1 ratio over the odor of a freshly painted surface containing TMPD monoisobutyrate coalescing aid.

[2] 90/10 solutions of water and solvent containing 2 drops of AMP 95 were aged at 120° F. for 4 weeks.

This example compares the coalescing aid of the present invention with a commercially available coalescing aid to show that the coalescing aid of the present invention exhibit comparable evaporation rate, water miscibility and hydrolytic stability to the commercially available coalescing aid of the present invention was preferred by a 2 to 1 ratio over the odor of the commercially-available coalescing aid.

EXAMPLE 3

A coalescing aid in accordance with the present invention, 2-ethyl-1,3-hexanediol monobutyrate and TMPD monoisobutyrate commercially available coalescing aid, were added to three different latex emulsions in order to compare their effect on the minimum film formation temperature of these latex emulsions.

Effect of Coalescing Aids on Minimum Film Formation Temperature (MFFT) of Latex Emulsions

| Wt %, Based on Wt of Emulsion Solids | 2-Ethyl-1,3-Hexanediol Monobutyrate MFFT, °F. | | | | TMPD Monoisobutyrate Coalescing Aid MFFT, °F. | | | |
|---|---|---|---|---|---|---|---|---|
| | 1%* | 3% | 6% | 9% | 1% | 3% | 6% | 9% |
| Rhoplex AC-490 Acrylic Resin | — | 53 | 39 | 32 | — | 56 | 46 | 36 |
| Flexbond 325 Polyvinyl Alcohol/Acrylic Resin | 51 | 44 | 35 | 32 | 51 | 45 | 37 | 32 |
| UCAR 503 Terpolymer Resin | 56 | 47 | 36 | 32 | 58 | 51 | 40 | 32 |

Rhoplex AC-490 Acrylic is an acrylic latex emulsion produced by Rohm & Haas
Flexbond 325 PVA/Acrylic is a polyvinyl acetate/acrylic copolymer
UCAR 503 Terpolymer is a polyvinyl acetate/vinyl acrylic terpolypolymer Example 3 shows that latex emulsions incorporating the coalescing aid of the present invention form films at lower temperatures than latex emulsions employing a commercially available coalescing aid. Minimum film formation temperature is a direct indication of the coalescing effect of coalescing aids on latex paints. As can be seen, incorporation of larger amounts of coalescing aid results in a lowering of the temperature required for film formation.

The invention has been described in detail with particular reference to preferred embodiments thereof, but it will be understood that variations and modifications can be effected within the spirit and scope of the invention.

We claim:

1. A paint composition which comprises a water-based latex dispersion and an effective amount of a coalescing aid selected from the group consisting of 2-ethyl-1,3-hexanediol monobutyrate, 2-ethyl-1,3-hexanediol isobutyrate, 2-methyl-1,3-hexanediol isobutyrate, and 2-methyl-1,3-hexanediol monobutyrate.

2. A composition according to claim 1 wherein said coalescing aid is present in an amount of about 1 weight percent to about 15 weight percent, based on the emulsion solids in said paint composition.

* * * * *